(12) United States Patent
Ide et al.

(10) Patent No.: US 7,670,982 B2
(45) Date of Patent: Mar. 2, 2010

(54) RARE-EARTH OXIDE SINTERED BODY AND MANUFACTURING METHOD

(75) Inventors: Takayuki Ide, Fukuoka (JP);
Masakatsu Kiyohara, Fukuoka (JP);
Masami Ando, Fukuoka (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 12/283,507

(22) Filed: Sep. 12, 2008

(65) Prior Publication Data

US 2009/0029844 A1    Jan. 29, 2009

Related U.S. Application Data

(62) Division of application No. 11/487,956, filed on Jul. 17, 2006, now Pat. No. 7,435,698.

(30) Foreign Application Priority Data

Sep. 26, 2005 (JP) .............................. 2005-277123
Jul. 13, 2006 (JP) .............................. 2006-192343

(51) Int. Cl.
C04B 35/50 (2006.01)

(52) U.S. Cl. ..................................................... 501/152

(58) Field of Classification Search ................. 501/152
See application file for complete search history.

(56) References Cited

U.S. PATENT DOCUMENTS

2006/0128547 A1    6/2006    Takada et al.

FOREIGN PATENT DOCUMENTS

| JP | 2000-239065 | | 9/2000 |
| WO | 2005073146 | * | 9/2004 |

OTHER PUBLICATIONS

Yanagita et al., "Preparation of Transparent Yttrium Oxide Ceramics by HIP Sintering; Annual Meeting of The Ceramic Society of Japan", 2004; Mar. 22, 2004, p. 234; published in Japan.

* cited by examiner

*Primary Examiner*—Karl E Group
(74) *Attorney, Agent, or Firm*—Carrier, Blackman & Associates, P.C.; Joseph P. Carrier; William D. Blackman

(57) ABSTRACT

A rare-earth oxide sintered body, or corrosion-resistant material, having low sintering temperature and high density is prepared by adding a boron compound at a ratio of 0.06 mol % or more and less than 25 mol % when converted into boron oxide ($B_2O_3$) to oxide powder of at least one of La, Nd, Sm, Eu, Gd, Dy, Ho, Er, Tm, Yb, Lu, and Sc, after which the mixed powder is formed and sintered. The sintered body comprises at least one of $La_2O_3$, $Nd_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$, $Lu_2O_3$, and $Sc_2O_3$, and at least one of $Ln_3BO_6$ (Ln=La, Nd, Sm, Eu, Gd, Dy, Ho, Er, Tm, Yb, and Lu), and $Sc_3BO_6$ as a main constituent crystal thereof.

6 Claims, 12 Drawing Sheets

RARE-EARTH OXIDE SINTERED BODY AND MANUFACTURING METHOD

CROSS-REFERENCE TO RELATED APPLICATIONS

The present application is a divisional application of U.S. Ser. No. 11/487,956, filed 17 Jul. 2006 (now U.S. Pat. No. 7,435,698), which claims priority from Japanese patent application 2005-277123, filed 26 Sep. 2005, and Japanese patent application 2006-192343, filed 13 Jul. 2006. The entire disclosure of each of the referenced priority documents is incorporated herein by reference.

BACKGROUND OF THE INVENTION

1. Field of the Invention

The present invention relates to a manufacturing method in which a rare-earth oxide can be sintered at low temperature.

2. Description of Background Art

As a common ceramic, alumina ($Al_2O_3$) or zirconia ($ZrO_2$) have been used. Although there is known amorphous formation, single-crystal growth and thin-film formation as the formation method, sintering is the most common method. Also, in order to easily complete sintering, a sintering aid is used.

The present inventors have paid attention to boron oxide ($B_2O_3$) as a sintering aid. Patent Document 1 and Non-patent Document 1 can be listed as a background art material in which boron oxide ($B_2O_3$) is used as a sintering aid.

Patent Document 1, Japanese Patent Application Publication No. 2000-239065, has disclosed that yttria ($Y_2O_3$) powder is formed by cold isostatical press (CIP), the formed body is fired at 1400-1800° C., cooled, and thereafter heated at 1400-2000° C. in the presence of a boron compound ($B_2O_3$), so that a dense yttria ($Y_2O_3$) sintered body can be obtained. According to Patent Document 1, it is assumed that the dense sintered body can be obtained because the presence of a boron compound promotes sintering due to diffusion of $B_2O_3$ inside the body.

Non-patent Document 1, *Production of Transparent Yttrium Oxide by HIP sintering*, The Ceramic Society of Japan, 2004, Preprint 2G09, has disclosed that yttria ($Y_2O_3$) powder is formed by CIP (140 MPa), first sintering is performed to the formed body at 1400-1700° C., BN is sprayed on the sintered body, and second sintering is performed by HIP (140 MPa, 1400-1700° C.), so that an yttria ($Y_2O_3$) sintered body having excellent transparency can be obtained.

However, according to these documents, firing at relatively high temperature such as 1700-2000° C. is required to obtain a sintered body having small porosity, or a complicated manufacturing process such as HIP processing after first sintering is required to obtain a sintered body.

An object of the present invention is to provide a rare-earth oxide sintered body and a corrosion-resistance material having high density and excellent plasma-resistance which can be manufactured easily at low temperature, and a manufacturing method thereof.

SUMMARY OF THE INVENTION

The above prior art materials fail to describe that boron oxide ($B_2O_3$) is added to rare-earth oxide powder as a sintering aid. Therefore, the present inventors made experiments on La, Nd, Sm, Eu, Gd, Dy, Ho, Er, Tm, Yb, Lu, and Sc among rare-earth elements.

As a result, it was confirmed that addition of boron oxide ($B_2O_3$) is effective with respect to rare-earth oxides of La, Nd, Sm, Eu, Gd, Dy, Ho, Er, Tm, Yb, Lu, and Sc.

Therefore, the rare-earth oxide sintered body according to the present invention includes at least one of $Ln_3BO_6$ (Ln=La, Nd, Sm, Eu, Gd, Dy, Ho, Er, Tm, Yb, and Lu), and $Sc_3BO_6$, together with at least one of the corresponding rare-earth oxides ($La_2O_3$, $Nd_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$, $Lu_2O_3$, and $Sc_2O_3$) as a main constituent crystal thereof.

The above-described rare-earth oxide sintered body includes a compound of rare earth and boron in which at least one of $Ln_3BO_6$ and $Sc_3BO_6$ includes as a main constituent crystal of the sintered body, so that the relative density of the sintered body can be increased. Incidentally, Ln refers to La, Nd, Sm, Eu, Gd, Dy, Ho, Er, Tm, Yb, or Lu.

Further, in order to allow the sintered body to include a compound of rare earth and boron as $Ln_3BO_6$ or $Sc_3BO_6$ so as to increase the relative density, the addition ratio of the boron oxide ($B_2O_3$) to the rare-earth oxide is 0.06 mol % or more and less than 25 mol %.

Each rare-earth element has different sintering temperature, and an element having a smaller ion radius tends to need higher sintering temperature. For example, the sintering temperature is 1100-1300° C. when boron oxide ($B_2O_3$) is added to lanthanum oxide ($La_2O_3$) (3 wt %:12.6 mol %), the sintering temperature is 1200-1400° C. when boron oxide ($B_2O_3$) is added to samarium oxide ($Sm_2O_3$) (3 wt %:13.4 mol %), the sintering temperature is 1100-1300° C. when boron oxide ($B_2O_3$) is added to neodymium oxide ($Nd_2O_3$) (3 wt %:13.0 mol %), and the sintering temperature is 1400-1500° C. when boron oxide ($B_2O_3$) is added to ytterbium oxide ($Yb_2O_3$) (3 wt %:14.9 mol %).

DETAILED DESCRIPTION OF PRESENT EMBODIMENTS

Example 1

Lanthanum oxide ($La_2O_3$) powder and boron oxide ($B_2O_3$) powder were prepared as raw powders. A sample in which boron oxide ($B_2O_3$) powder was not added to lanthanum oxide ($La_2O_3$) powder and another sample in which boron oxide ($B_2O_3$) powder was added to lanthanum oxide ($La_2O_3$) powder at a ratio of 3.0 wt % (12.6 mol %) were prepared. The two kinds of samples were formed and fired at a firing furnace.

Figure 1:
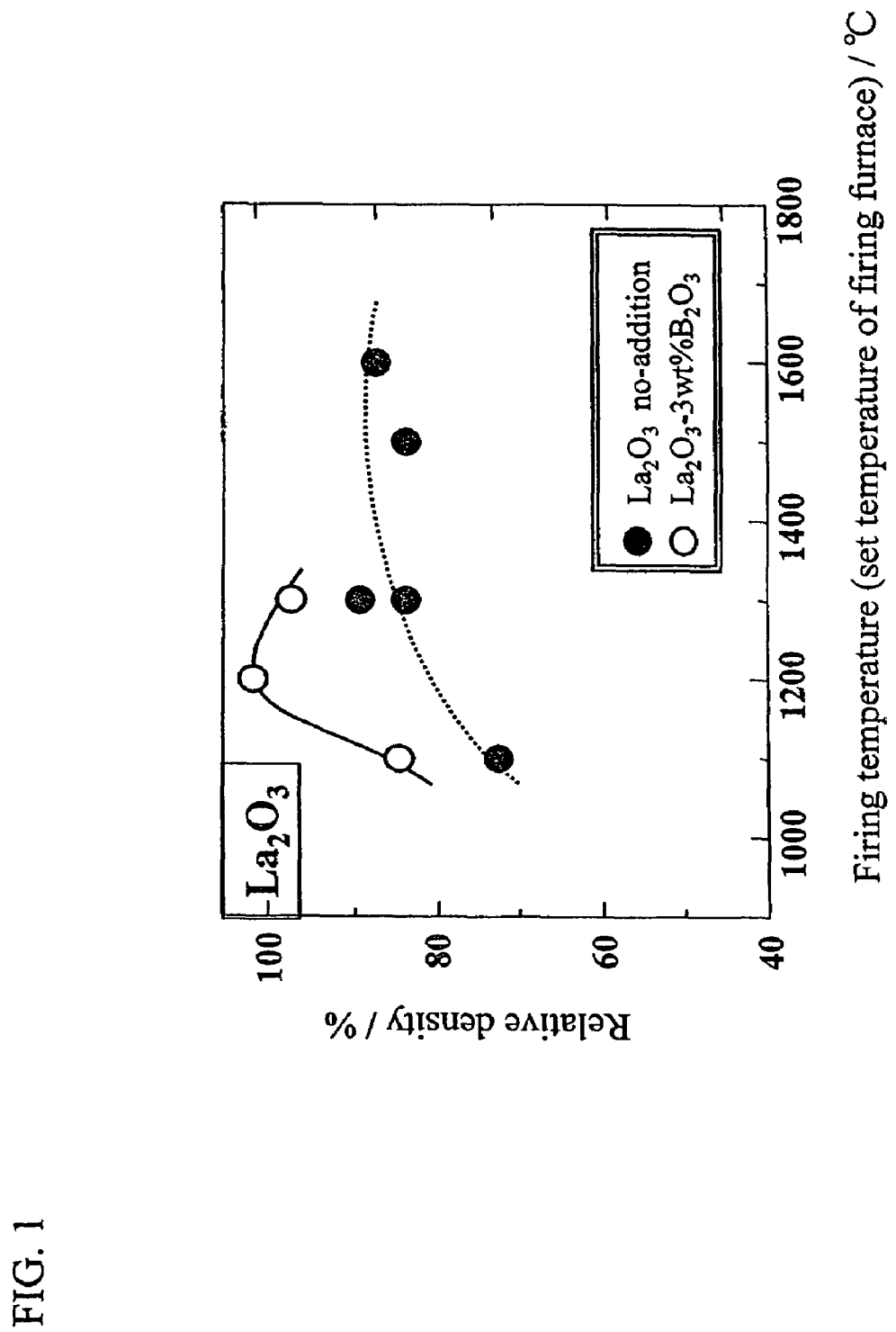
FIG. 1 is a graph showing the relationship between firing temperature and relative density when boron oxide ($B_2O_3$) powder is added to lanthanum oxide ($La_2O_3$) powder.

The relationship between the firing temperature and the relative density is shown in FIG. 1. FIG. 1 shows that the relative density is around 80% in the case of adding no boron oxide ($B_2O_3$), while the relative density exceeds 95% at around 1130° C. and the sintering completes around 1200° C. where the relative density is around 99% or more in the case of adding boron oxide ($B_2O_3$) to lanthanum oxide ($La_2O_3$).

Example 2

Samarium oxide ($Sm_2O_3$) powder and boron oxide ($B_2O_3$) powder were prepared as raw powders. A sample in which boron oxide ($B_2O_3$) powder was not added to samarium oxide ($Sm_2O_3$) powder and another sample in which boron oxide ($B_2O_3$) powder was added to samarium oxide ($Sm_2O_3$) powder at a ratio of 3.0 wt % (13.4 mol %) were prepared. The two kinds of samples were formed and fired at a firing furnace.

Figure 2:
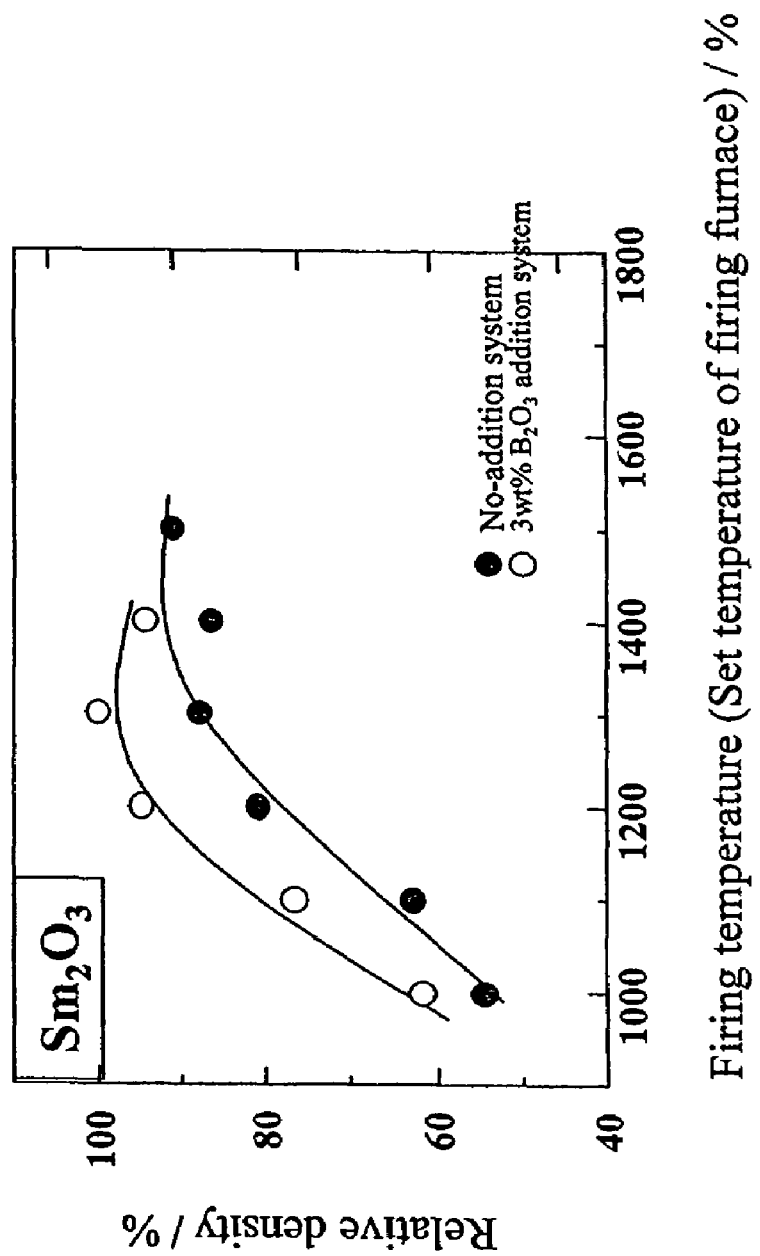
FIG. 2 is a graph showing the relationship between firing temperature and relative density when boron oxide ($B_2O_3$) powder is added to samarium oxide ($Sm_2O_3$) powder.

The relationship between the firing temperature and the relative density is shown in FIG. 2. FIG. 2 shows that the relative density exceeds 95% at around 1200° C. and the sintering completes around 1300° C. where the relative density is around 99% or more in the case of adding boron oxide ($B_2O_3$) to samarium oxide ($Sm_2O_3$).

Example 3

Neodymium oxide ($Nd_2O_3$) powder and boron oxide ($B_2O_3$) powder were prepared as raw powders. A sample in which boron oxide ($B_2O_3$) powder was not added to neodymium oxide ($Nd_2O_3$) powder and another sample in which boron oxide ($B_2O_3$) powder was added to neodymium oxide ($Nd_2O_3$) powder at a ratio of 3.0 wt % (13.0 mol %) were prepared. The two kinds of samples were formed and fired at a firing furnace.

Figure 3:
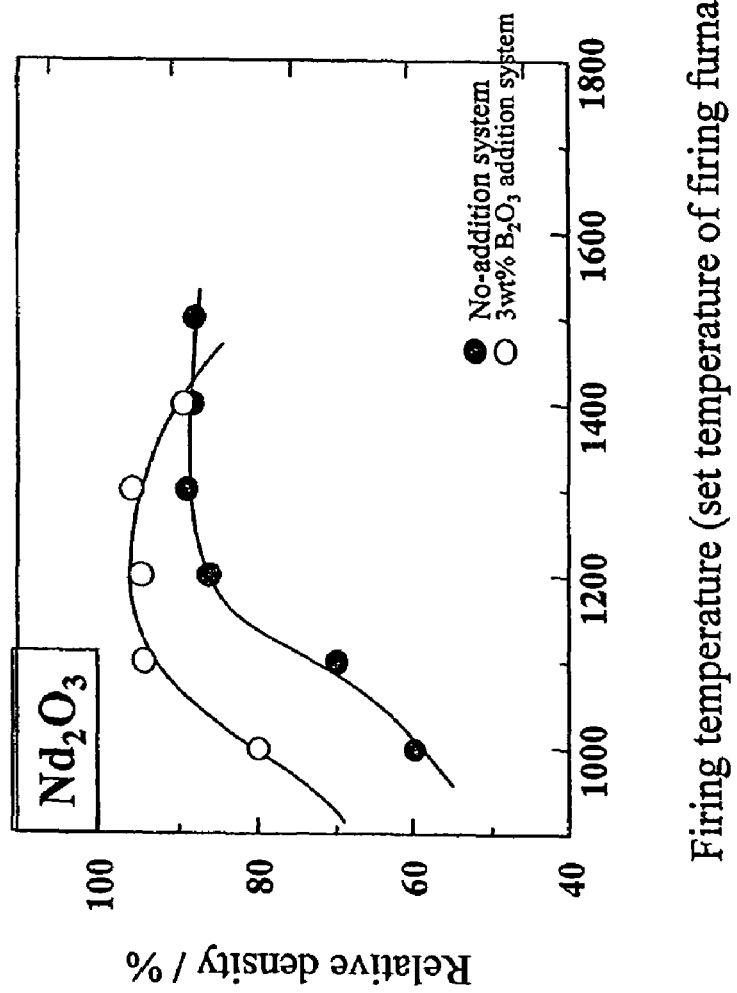
FIG. 3 is a graph showing the relationship between firing temperature and relative density when boron oxide ($B_2O_3$) powder is added to neodymium oxide ($Nd_2O_3$) powder.

The relationship between the firing temperature and the relative density is shown in FIG. 3. FIG. 3 shows that the sintering completes around 1200° C. where the relative density is around 95% or more in the case of adding boron oxide ($B_2O_3$) to neodymium oxide ($Nd_2O_3$).

Example 4

Ytterbium oxide ($Yb_2O_3$) powder and boron oxide ($B_2O_3$) powder were prepared as raw powders. A sample in which boron oxide ($B_2O_3$) powder was not added to ytterbium oxide ($Yb_2O_3$) powder and another sample in which boron oxide ($B_2O_3$) powder was added to ytterbium oxide ($Yb_2O_3$) powder at a ratio of 3.0 wt % (14.9 mol %) were prepared. The two kinds of samples were formed and fired at a firing furnace.

Figure 4:
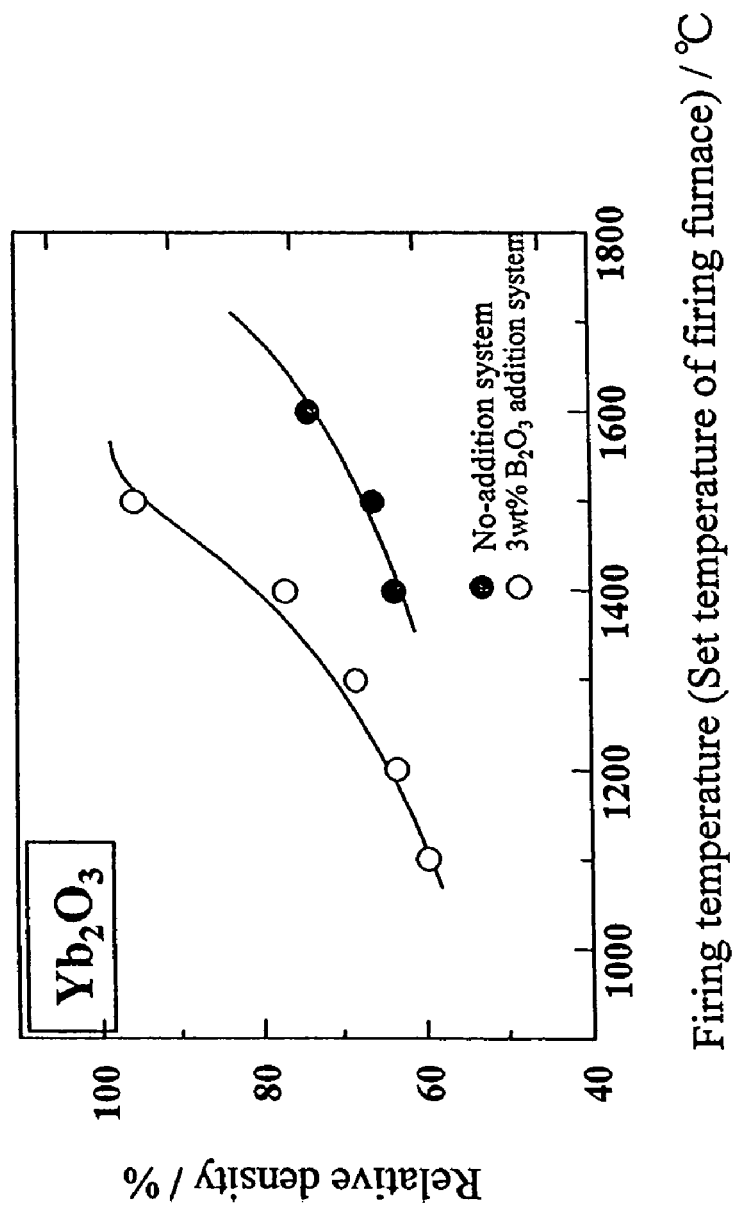
FIG. 4 is a graph showing the relationship between firing temperature and relative density when boron oxide ($B_2O_3$) powder is added to ytterbium oxide ($Yb_2O_3$) powder.

The relationship between the firing temperature and the relative density is shown in FIG. 4. FIG. 4 shows that the relative density is around 60-70% in the case of adding no boron oxide ($B_2O_3$), while the relative density exceeds 95% at around 1500° C. in the case of adding boron oxide ($B_2O_3$) to ytterbium oxide ($Yb_2O_3$).

Example 5

Europium oxide ($Eu_2O_3$) powder and boron oxide ($B_2O_3$) powder were prepared as raw powders. A sample in which boron oxide ($B_2O_3$) powder was not added to europium oxide ($Eu_2O_3$) powder and another sample in which boron oxide ($B_2O_3$) powder was added to europium oxide ($Eu_2O_3$) powder at a ratio of 9.0 mol % were prepared. The two kinds of samples were formed and fired at a firing furnace.

Figure 5:
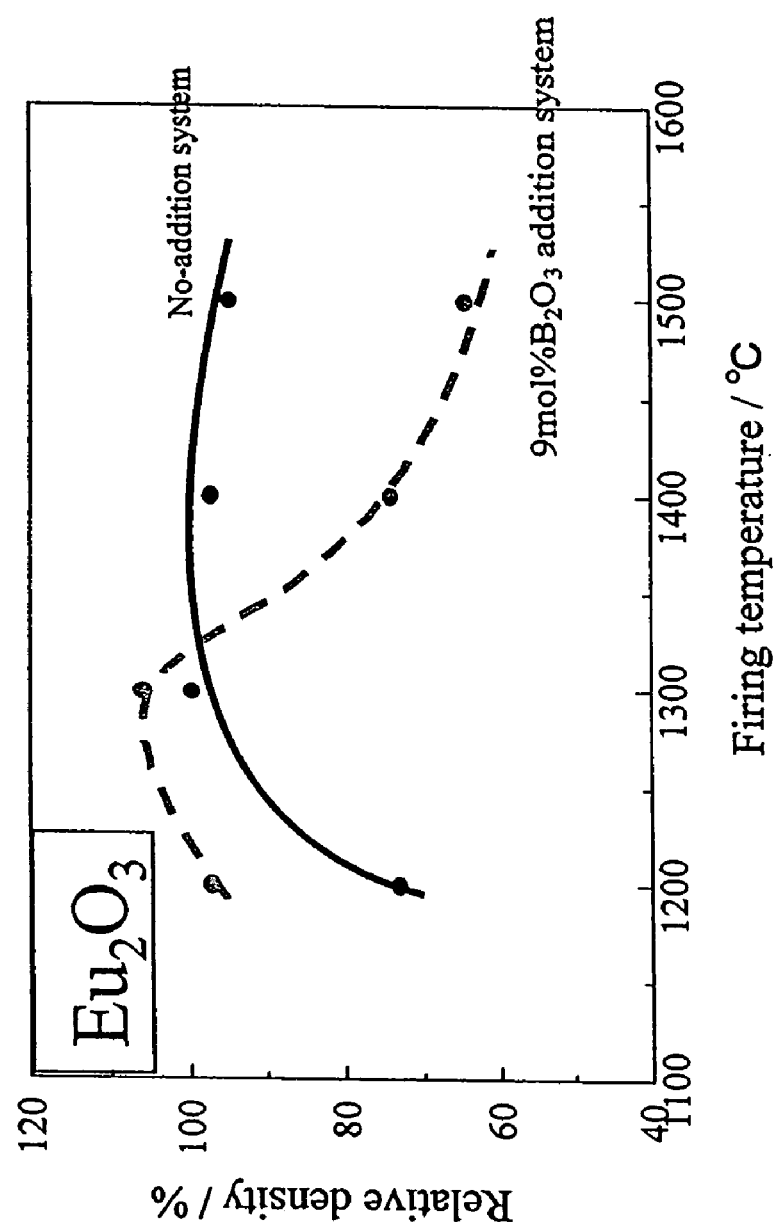
FIG. 5 is a graph showing the relationship between firing temperature and relative density when boron oxide ($B_2O_3$) powder is added to europium oxide ($Eu_2O_3$) powder.

The relationship between the firing temperature and the relative density is shown in FIG. 5. FIG. 5 shows that densification occurs at 1300° C. or more in the case of adding no boron oxide ($B_2O_3$), while the relative density exceeds 95% at around 1200° C. and the sintering completes at around 1300° C. where the relative density is around 99% or more in the case of adding boron oxide ($B_2O_3$) to europium oxide ($Eu_2O_3$).

Example 6

Dysprosium oxide ($Dy_2O_3$) powder and boron oxide ($B_2O_3$) powder were prepared as raw powders. A sample in which boron oxide ($B_2O_3$) powder was not added to dysprosium oxide ($Dy_2O_3$) powder and another sample in which boron oxide ($B_2O_3$) powder was added to dysprosium oxide ($Dy_2O_3$) powder at a ratio of 9.0 mol % were prepared. The two kinds of samples were formed and fired at a firing furnace.

Figure 6:
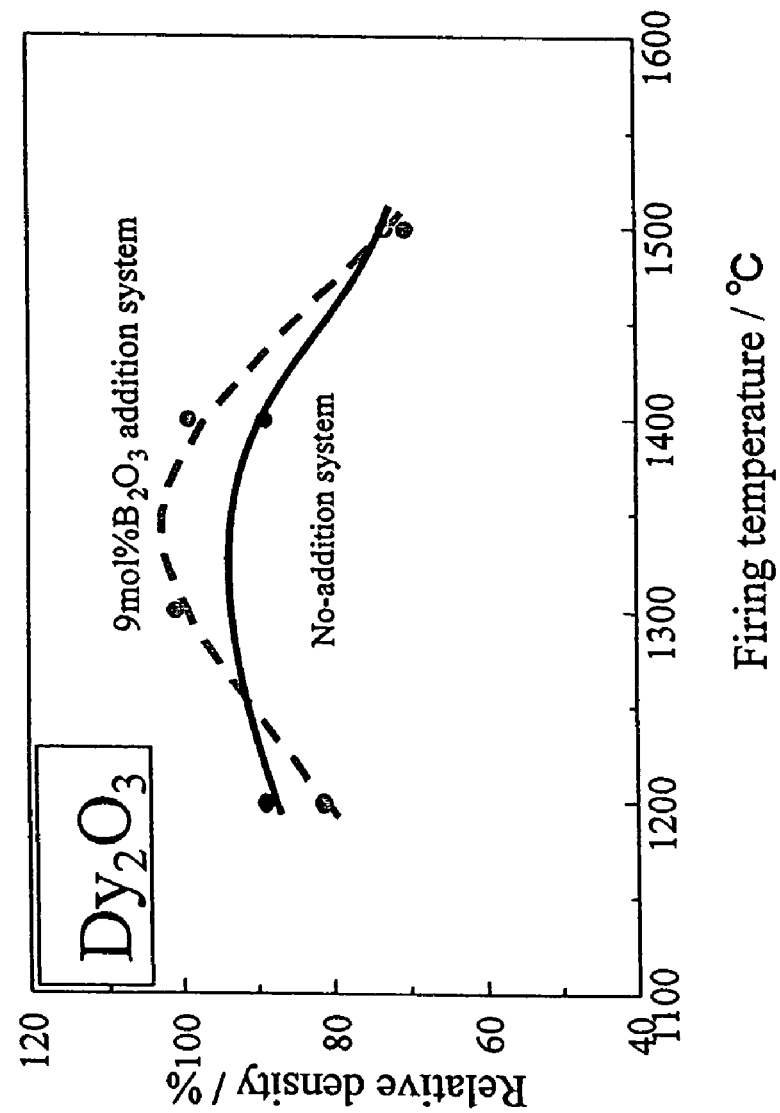
FIG. 6 is a graph showing the relationship between firing temperature and relative density when boron oxide ($B_2O_3$) powder is added to dysprosium oxide ($Dy_2O_3$) powder.

The relationship between the firing temperature and the relative density is shown in FIG. 6. FIG. 6 shows the relative density is around 95% in the case of adding no boron oxide ($B_2O_3$), while the relative density exceeds around 99% at 1300-1400° C. in the case of adding boron oxide ($B_2O_3$) to dysprosium oxide ($Dy_2O_3$) powder.

Example 7

Gadolinium oxide ($Gd_2O_3$) powder and boron oxide ($B_2O_3$) powder were prepared as raw powders. A sample in which boron oxide ($B_2O_3$) powder was not added to gadolinium oxide ($Gd_2O_3$) powder and another sample in which boron oxide ($B_2O_3$) powder was added to gadolinium oxide ($Gd_2O_3$) powder at a ratio of 9.0 mol % were prepared. The two kinds of samples were formed and fired at a firing furnace.

Figure 7:
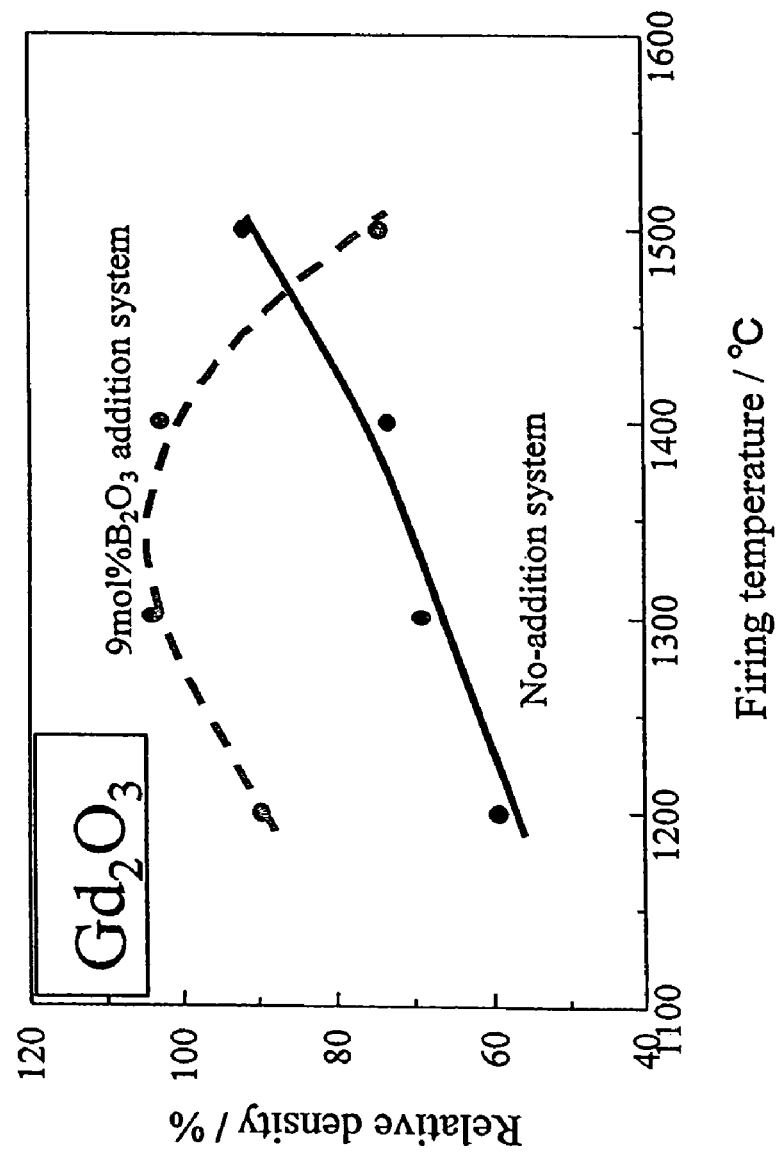
FIG. 7 is a graph showing the relationship between firing temperature and relative density when boron oxide ($B_2O_3$) powder is added to gadolinium oxide ($Gd_2O_3$) powder.

The relationship between the firing temperature and the relative density is shown in FIG. 7. FIG. 7 shows that densification occurs at 1500° C. or more in the case of adding no boron oxide ($B_2O_3$), while the relative density exceeds 99% at around 1300° C. and the sintering completes at around 1300-1400° C. where the relative density is around 99% or more in the case of adding boron oxide ($B_2O_3$) to gadolinium oxide ($Gd_2O_3$).

Example 8

Holmium oxide ($Ho_2O_3$) powder and boron oxide ($B_2O_3$) powder were prepared as raw powders. A sample in which boron oxide ($B_2O_3$) powder was not added to holmium oxide ($Ho_2O_3$) powder and another sample in which boron oxide ($B_2O_3$) powder was added to holmium oxide ($Ho_2O_3$) powder at a ratio of 9.0 mol % were prepared. The two kinds of samples were formed and fired at a firing furnace.

Figure 8:
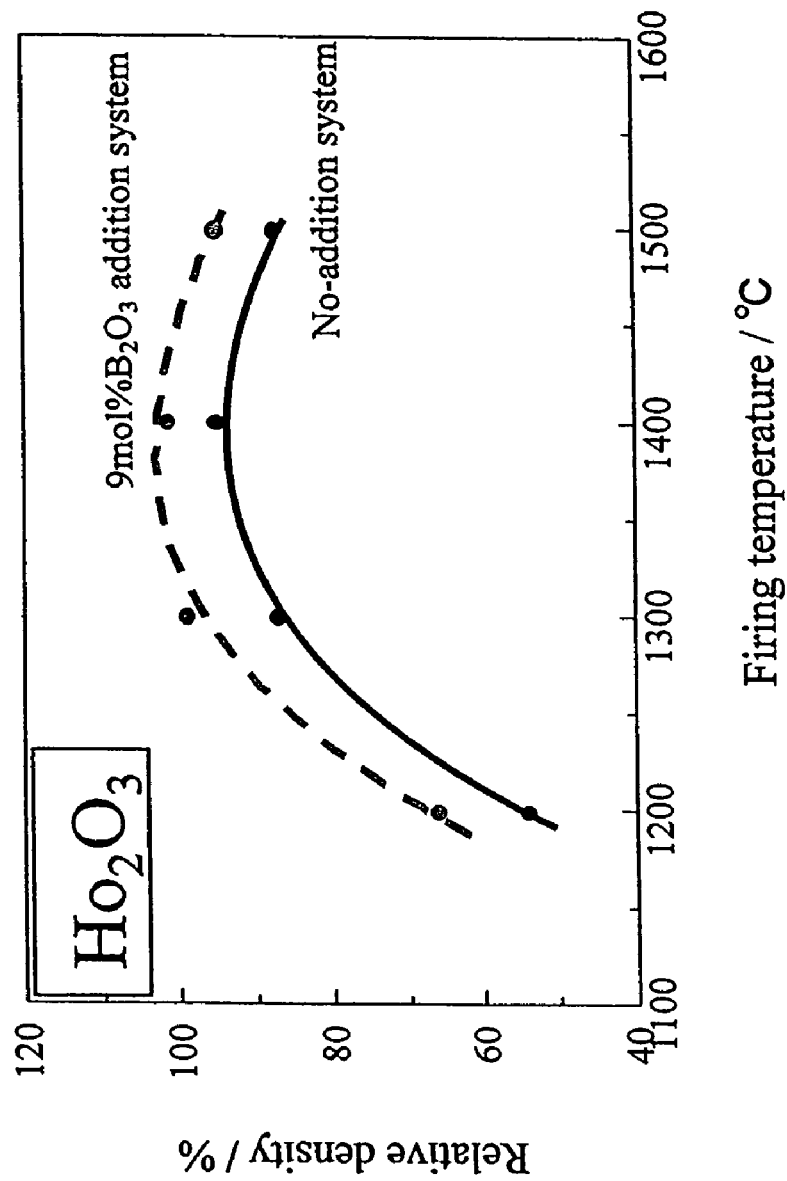
FIG. 8 is a graph showing the relationship between firing temperature and relative density when boron oxide ($B_2O_3$) powder is added to holmium oxide ($Ho_2O_3$) powder.

The relationship between the firing temperature and the relative density is shown in FIG. 8. FIG. 8 shows that the firing curve has a similar tendency in the case of adding no boron oxide ($B_2O_3$) and the case of adding boron oxide ($B_2O_3$) to holmium oxide ($Ho_2O_3$). However, densification further proceeds in the case of adding boron oxide ($B_2O_3$).

Example 9

Erbium oxide ($Er_2O_3$) powder and boron oxide ($B_2O_3$) powder were prepared as raw powders. A sample in which boron oxide ($B_2O_3$) powder was not added to erbium oxide ($Er_2O_3$) powder and another sample in which boron oxide ($B_2O_3$) powder was added to erbium oxide ($Er_2O_3$) powder at a ratio of 9.0 mol % were prepared. The two kinds of samples were formed and fired at a firing furnace.

Figure 9:
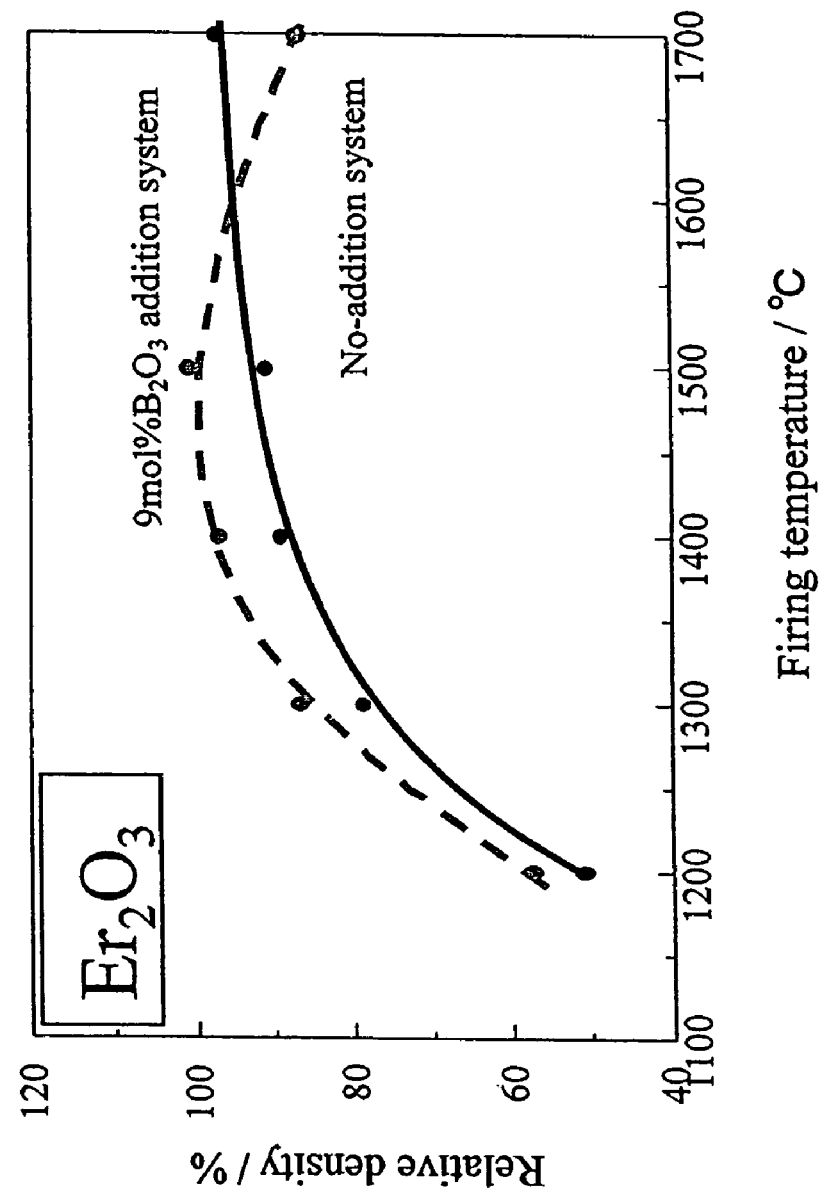
FIG. 9 is a graph showing the relationship between firing temperature and relative density when boron oxide ($B_2O_3$) powder is added to erbium oxide ($Er_2O_3$) powder.

The relationship between the firing temperature and the relative density is shown in FIG. 9. FIG. 9 shows that densification occurs at 1700° C. in the case of adding no boron oxide ($B_2O_3$), while the relative density exceeds 95% at around 1400° C. and the sintering completes at around 1500° C. where the relative density is around 99% or more in the case of adding boron oxide ($B_2O_3$) to erbium oxide ($Er_2O_3$).

Example 10

Scandium oxide ($Sc_2O_3$) powder and boron oxide ($B_2O_3$) powder were prepared as raw powders. A sample in which boron oxide ($B_2O_3$) powder was not added to scandium oxide ($Sc_2O_3$) powder and another sample in which boron oxide ($B_2O_3$) powder was added to scandium oxide ($Sc_2O_3$) powder at a ratio of 9.0 mol % were prepared. The two kinds of samples were formed and fired at a firing furnace.

Figure 10:
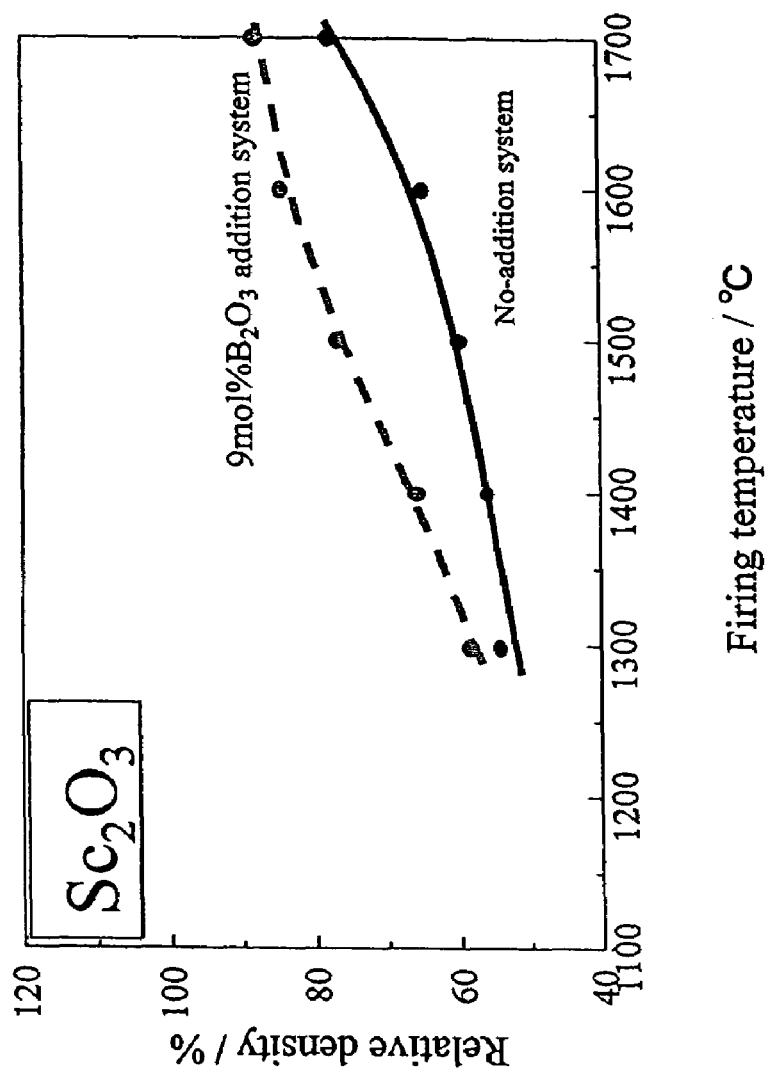
FIG. 10 is a graph showing the relationship between firing temperature and relative density when boron oxide ($B_2O_3$) powder is added to scandium oxide ($Sc_2O_3$) powder.

The relationship between the firing temperature and the relative density is shown in FIG. 10. FIG. 10 shows that the firing curve has a similar tendency in the case of adding no boron oxide ($B_2O_3$) and the case of adding boron oxide ($B_2O_3$) to scandium oxide ($Sc_2O_3$). However, densification further proceeds in the case of adding boron oxide ($B_2O_3$).

Example 11

Thulium oxide ($Tm_2O_3$) powder and boron oxide ($B_2O_3$) powder were prepared as raw powders. A sample in which boron oxide ($B_2O_3$) powder was not added to thulium oxide ($Tm_2O_3$) powder and another sample in which boron oxide ($B_2O_3$) powder was added to thulium oxide ($Tm_2O_3$) powder at a ratio of 9.0 mol % were prepared. The two kinds of samples were formed and fired at a firing furnace.

Figure 11:
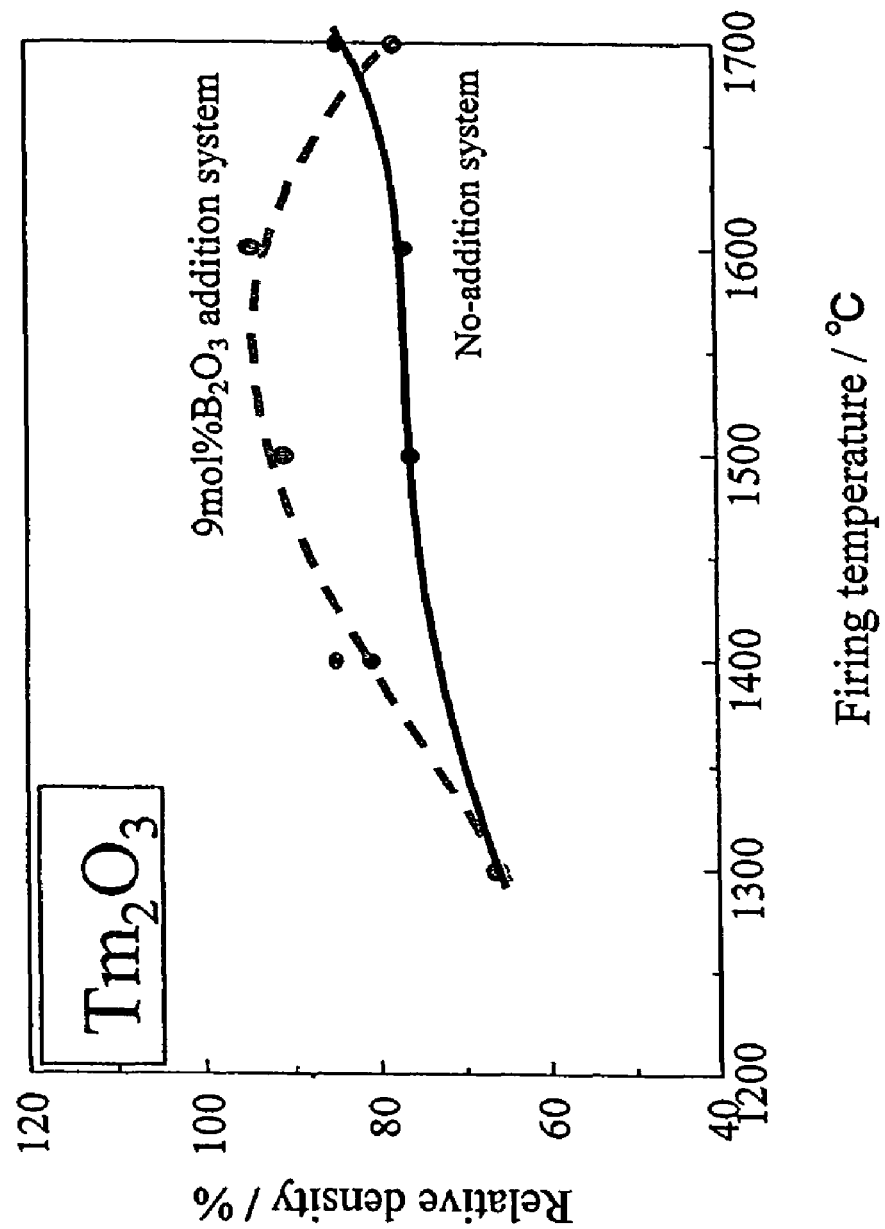
FIG. 11 is a graph showing the relationship between firing temperature and relative density when boron oxide ($B_2O_3$) powder is added to thulium oxide ($Tm_2O_3$) powder.

The relationship between the firing temperature and the relative density is shown in FIG. 11. FIG. 11 shows that the relative density exceeds 80% at 1700° C. in the case of adding no boron oxide ($B_2O_3$), while the relative density exceeds 90% at around 1500° C. and a sintered body having high density can be obtained at around 1500° C. in the case of adding boron oxide ($B_2O_3$) to thulium oxide ($Tm_2O_3$).

Example 12

Lutetium oxide ($Lu_2O_3$) powder and boron oxide ($B_2O_3$) powder were prepared as raw powders. A sample in which boron oxide ($B_2O_3$) powder was not added to lutetium oxide ($Lu_2O_3$) powder and another sample in which boron oxide ($B_2O_3$) powder was added to lutetium oxide ($Lu_2O_3$) powder at a ratio of 9.0 mol % were prepared. The two kinds of samples were formed and fired at a firing furnace.

Figure 12:
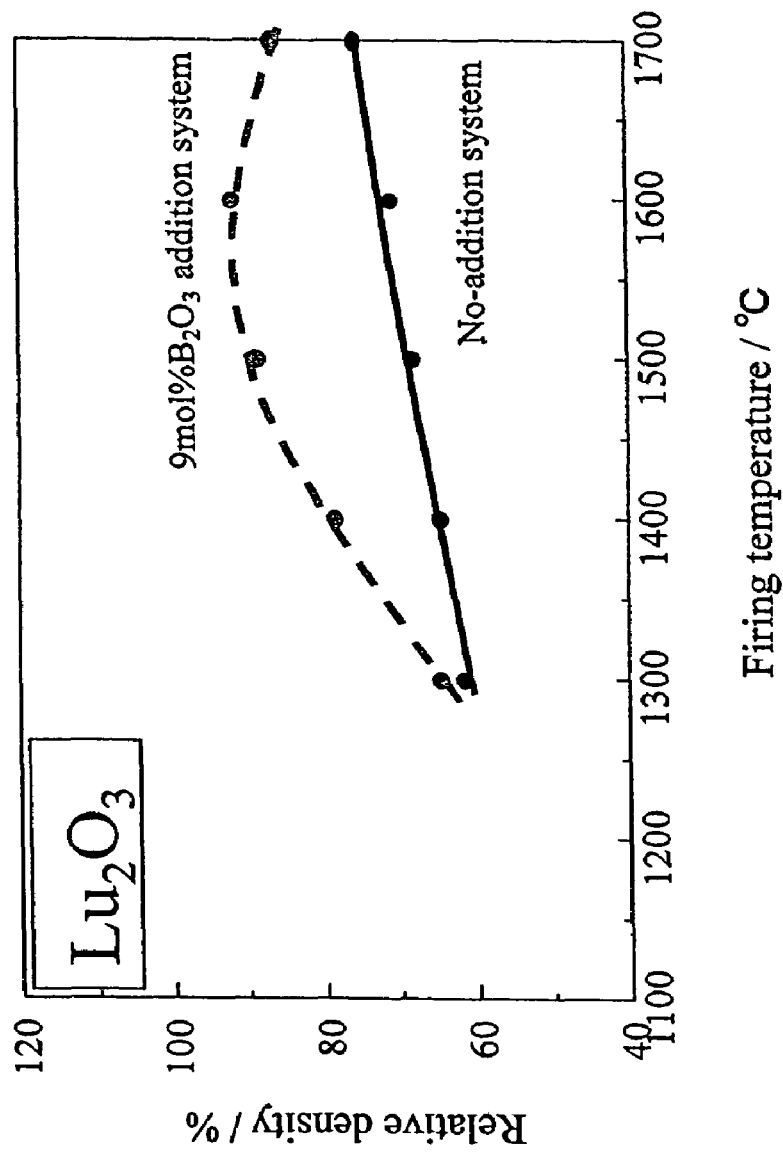
FIG. 12 is a graph showing the relationship between firing temperature and relative density when boron oxide ($B_2O_3$) powder is added to lutetium oxide ($Lu_2O_3$) powder.

The relationship between the firing temperature and the relative density is shown in FIG. 12. FIG. 12 shows that the relative density is less than 80% at 1700° C. in the case of adding no boron oxide ($B_2O_3$), while the relative density is around 90% at around 1500° C. and a sintered body having high density can be obtained at around 1600° C. in the case of adding boron oxide ($B_2O_3$) to lutetium oxide ($Lu_2O_3$).

According to the present invention, it is possible to obtain a sintered body having density of 95% at relatively low temperature less than 1550° C.

When the temperature is less than 1550° C., it is possible to perform firing easily in an atmosphere with a general-purpose firing furnace using a molybdenum disilicide heater or an SiC heater as a heating member.

As the boron compound, boric acid ($H_3BO_3$), boron nitride (BN) or boron carbide ($B_4C$) may be used as well as boron oxide. Among these, boron oxide and boric acid are preferred.

Also, plasma-resistance was evaluated. The evaluation method is as follows: Samples were polished such that each sintered body had a surface roughness (Ra) of 0.1 μm or less. Half the surface of each sample was masked, and irradiated with plasma by using $CF_4+O_2$ as etching gas at 1000 W for 30 hours in an RIE plasma etching apparatus. After irradiation, the mask was removed, and the difference between the masked area and non-masked area were measured so as to calculate the etching speed (nm/hr). The results are shown in Table 1. In the examples, boron oxide ($B_2O_3$) of 9 mol % was added to rare-earth oxides. In the comparative example, high-purity alumina (purity: 99.7%) was used. Table 1 shows that rare-earth oxides to which boron oxide ($B_2O_3$) was added as a sintering aid had much lower etching speed and better plasma-resistance than high-purity alumina.

TABLE 1

|  | Material | Etching speed (nm/hr) |
|---|---|---|
| Example | $Eu_2O_3$ | 70 |
|  | $Gd_2O_3$ | 93 |
|  | $Dy_2O_3$ | 53 |
|  | $Ho_2O_3$ | 47 |
|  | $Er_2O_3$ | 50 |
|  | $Tm_2O_3$ | 47 |
|  | $Yb_2O_3$ | 43 |
|  | $Lu_2O_3$ | 43 |
|  | $Sc_2O_3$ | 27 |
| Comparative Example | $Al_2O_3$ | 217 |

The rare-earth oxide sintered body according to the present invention can be used as a corrosion-resistant material which requires plasma-resistance such as a chamber, a capture ring, a focus ring, an electrostatic chuck of a plasma processing apparatus.

According to the present invention, it is possible to obtain a rare-earth oxide sintered body having high density at relatively low temperature.

Although there have been described what are the present embodiments of the invention, it will be understood that variations and modifications may be made thereto within the scope of the claims appended hereto.

What is claimed is:

1. A method for manufacturing a rare-earth oxide sintered body comprising the steps of:

adding a boron compound at a ratio of 0.06 mol % or more and less than 25 mol % when converted into boron oxide ($B_2O_3$) to oxide powder of at least one of La, Nd, Sm, Eu, Gd, Dy, Ho, Er, Tm, Yb, Lu, and Sc;

forming the mixed powder; and performing sintering such that a resulting sintered body comprises at least one of $La_2O_3$, $Nd_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$, $Lu_2O_3$, and $Sc_2O_3$, and at least one of $Ln_3BO_6$ (Ln=La, Nd, Sm, Eu, Gd, Dy, Ho, Er, Tm, Yb, and Lu), and $Sc_3BO_6$ as a main constituent crystal thereof.

2. A method according to claim 1, wherein the sintering is performed at a temperature of at least 1100° C.

3. A method according to claim 1, wherein the sintered body comprises $Ln_3BO_6$ (Ln=La, Nd, Sm, Eu, Gd, Dy, Ho, Er, Tm, Yb, and Lu) and at least one of $La_2O_3$, $Nd_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$, and $Lu_2O_3$ as the main constituent crystal thereof and is sintered at a temperature in a range of approximately 1100° C.-1550° C.

4. A method according to claim 1, wherein the sintered body comprises at least one of $Lu_3BO_6$, $Yb_3BO_6$, $Tm_3BO_6$, and $Sc_3BO_6$, and at least one of $Lu_2O_3$, $Yb_2O_3$, $Tm_2O_3$, and $Sc_2O_3$ as the main constituent crystal thereof and is sintered at a temperature in a range of approximately 1100° C.-1700° C.

5. A method according to claim 1, consisting essentially of at least one of $La_2O_3$, $Nd_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$, $Lu_2O_3$, and $Sc_2O_3$, and at least one of $Ln_3BO_6$ (Ln=La, Nd, Sm, Eu, Gd, Dy, Ho, Er, Tm, Yb, and Lu), and $Sc_3BO_6$.

6. A method according to claim 1, wherein the resulting sintered body consists essentially of at least one of $La_2O_3$, $Nd_2O_3$, $Sm_2O_3$, $Eu_2O_3$, $Gd_2O_3$, $Dy_2O_3$, $Ho_2O_3$, $Er_2O_3$, $Tm_2O_3$, $Yb_2O_3$, $Lu_2O_3$, and $Sc_2O_3$, and at least one of $Ln_3BO_6$ (Ln=La, Nd, Sm, Eu, Gd, Dy, Ho, Er, Tm, Yb, and Lu), and $Sc_3BO_6$.

* * * * *

UNITED STATES PATENT AND TRADEMARK OFFICE
CERTIFICATE OF CORRECTION

PATENT NO. : 7,670,982 B2  Page 1 of 1
APPLICATION NO. : 12/283507
DATED : March 2, 2010
INVENTOR(S) : Ide et al.

It is certified that error appears in the above-identified patent and that said Letters Patent is hereby corrected as shown below:

Title page:
After Item "*Primary Examiner—*", change "Karl E Group" to --Karl E. Group--.

Drawings:
Page 2 of 12, in the abscissa label of FIG. 2, change "firing furnace)/%" to --firing furnace)/°C--.

Column 1:
Line 34, change "isostatical press" to --isostatic press--.
Line 56, change "corrosion-resistance" to --corrosion-resistant--.
Line 57, change "plasma-resistance" to --plasma resistance--.

Column 6:
Line 36 and line 54, change "plasma-resistance" to --plasma resistance--.

Signed and Sealed this

Twenty-second Day of June, 2010

David J. Kappos
*Director of the United States Patent and Trademark Office*